Patented June 21, 1927.

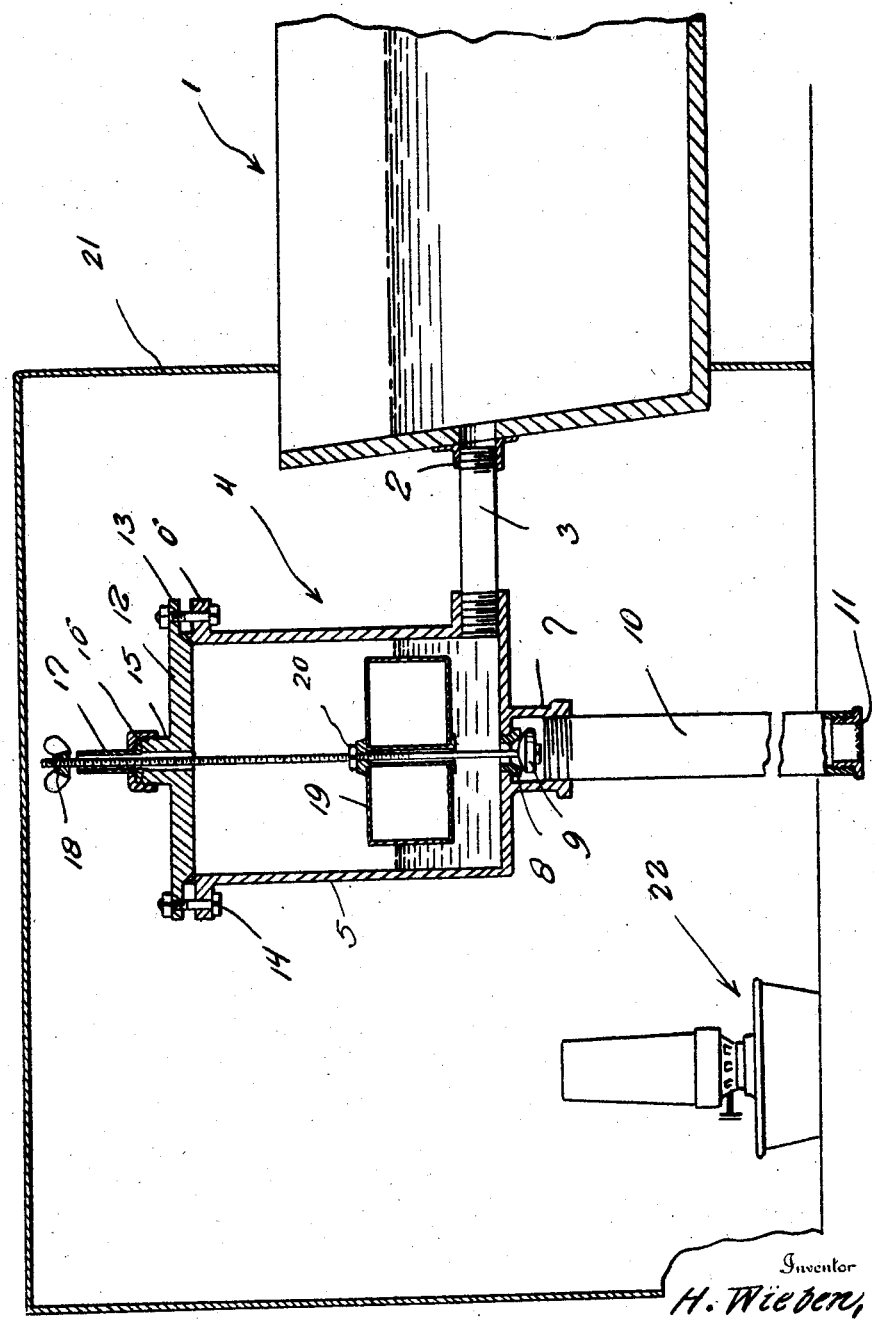

1,633,150

UNITED STATES PATENT OFFICE.

HENRY WIEBEN, OF REINBECK, IOWA.

WATERING TROUGH.

Application filed October 7, 1925. Serial No. 61,044.

This invention relates to an improved watering trough adapted to supply stock, hogs, chickens, and the like with drinking water.

Briefly, the invention has reference to a watering trough which is adapted to contain a predetermined quantity of water, there being a float controlled device associated therewith for assuring a constant supply and maintaining a certain level.

A housing is placed about the float control device serving as a shelter and as a means for containing a heating lamp or its equivalent for preventing freezing of the water, particularly in cold weather.

Other more specific features and advantages of the invention will be apparent from the following description and drawings.

In the accompanying drawing forming a part of this application and in which like numerals are employed to designate like parts throughout the same:—

The figure is a view in section and elevation of an apparatus constructed in accordance with the present invention.

Referring to the drawings in detail, the reference character 1 designates the water trough proper. This is adapted to be filled with drinking water to the approximate level indicated. The water intake port is formed in one end and at this end is an appropriately mounted nipple 2 with which a pipe 3 is connected.

It is with the pipe 3 that the improved float controlled device 4 is associated. This device comprises a substantially cylindrical container 5 having an outstanding flange 6 at its top and a coupling neck 7 at its bottom. Also in the bottom is an opening surrounded by the valve seat 8 with which the valve 9 cooperates.

A depending water supply pipe 10 is connected with the neck 7 and is provided in its bottom with a removable fitting 11 carrying a strainer. This end of the pipe is connected with any suitable source of water supply. The strainer at the entrance of the pipe filters the water to a certain extent. A removable cover plate 12 is provided for the open top of the container 5 and this plate has a peripheral flange 13 which is secured by bolts 14 to the flange 6. Appropriate packing may be interposed between the cover and the top of the container.

It will be noted that the cover is formed at its center with an opening surrounded by an upstanding tubular part 15 which is externally screw threaded. A screw cap 16 is connected with the part 15 and serves to clamp an upstanding tube 17 in place. This construction affords a fluid-tight connection at a point of connection of the cap 16 and serves as an appropriate vent for the air in the container.

It will be noted that the valve 9 is carried by the lower headed end of a screw threaded stem or rod 18. This rod extends up through the opening into the cover and then on through and beyond the tube 17. The intermediate portion of the rod extends slidably through the central tubular guide of the float 19, there being a nut 20 on the threaded portion serving as an adjustable abutment for the float. The float may rise in water until it strikes this abutment, and the abutment may be arranged at any desired point. In this way, it is that the level of water in the main trough is varied or maintained.

An appropriate housing 21 is arranged over the float control device and one end portion of the trough. The housing may be in the form of a metal casing to serve as a protector for the device 4 and as a heat confining means for the oil burning lamp or heater 22. In practice the housing may be formed with a door by means of which access may be had to the interior. Moreover, it will be formed at one end with an opening fitting snugly but slidably upon the trough 1. This will allow the housing to be slid over the trough to the desired extent so that it may serve as a gauge to cover more or less of the water surface. This allows the available water space to be regulated so that a small number or a large number of animals may be more conveniently accommodated.

Attention is directed to the fact that a wing nut is preferably placed on the upper end of the screw threaded stem 18 as shown for the purpose of lifting the stem upwardly and bringing the valve 9 against the seat 8 for closing the same and holding it closed for desired purposes. At this time it is preferable to remove the parts 16 and 17 to allow the wing nut to bind directly against the upstanding neck 15.

It is believed that by carefully considering the description in connection with the drawings, persons familiar with devices of this class will be able to obtain a clear understanding of the invention. Therefore, a more lengthy description is thought unnecessary.

While I have described the preferred embodiment of the invention, it is to be understood that minor changes coming within the field of invention claimed may be resorted to if desired.

Having thus described my invention, what I claim as new is:—

In a structure of the class described, in combination, a water trough, a float controlled water supply device connected with one end of the trough, a housing enclosing said water supply device, said housing being provided in one end with an opening through which an adjacent end portion of the trough extends, said housing being slidably connected with the trough in order that it may be slid over the trough to regulate the available water space.

In testimony whereof I affix my signature.

HENRY WIEBEN.